United States Patent Office 3,570,143
Patented Mar. 16, 1971

3,570,143
WAVEFORM SIMULATOR
T. O. Paine, Acting Administrator of the National Aeronautics and Space Administration, in respect to an invention of Charles D. Moore, Poway, and John H. Malmberg, Del Mar. Calif.
Filed Nov. 8, 1968, Ser. No. 774,265
Int. Cl. G09b 23/18
U.S. Cl. 35—19          3 Claims

ABSTRACT OF THE DISCLOSURE

An apparatus for simulating a waveform consisting of a mixture of exponentially damped sine waves is described. The apparatus generates a series of damped sine waves of variable amplitude, frequency, damping factor and phase. These waveforms are added and displayed on an oscilloscope. Their parameters are adjustable to obtain a complex waveform which simulates a curve to be analyzed.

ORIGIN OF INVENTION

The invention described herein was made in the performance of work under a NASA contract and is subject to the provisions of Section 305 of the National Aeronautics and Space Act of 1958, Public Law 85–568 (72 stat. 435; 42 USC 2457).

BACKGROUND OF THE INVENTION

(1) Field of the invention

The present invention relates to a complex waveform synthesizing apparatus and, more particularly, to an improved apparatus for simulating a complex waveform, consisting of two or more waveforms with variable parameters.

(2) Description of the prior art

In the performance of scientific experiments or applications, it is sometimes necessary to synthesize a complex waveform or curve which is the sum of two or more simpler functions. For proper interpretation or synthesis, the curve must be reduced to its component parts. For exemple, in the application of radio frequency interferometer technique in the measurements of plasma wave propagation, when two or more modes at the same frequency but with different wavelengths are present in the plasma, a composite curve, which is the sum of two or more exponentially damped sine waves with independent amplitudes, frequencies, damping rates and phases, its generated. To properly interpret such a curve, it is necessary to reduce it to its component parts in order to determine the amplitude, frequency, damping rate and phase relationship of each exponetially damped sine wave.

Graphical analysis of such a curve, a technique hereinbefore employed, is only practical in simple cases and if the degree of precision which is required is not particularly high. However, in complicated cases or when the required degree of precision is quite high, other techniques must be employed. The curve may be analyzed by digitizing it and supplying the digitized information to a computer for processing. However, such a technique suffers from several disadvantages, one of which is the necessity of converting the complex curve, which is available only as a graph, into digital values to be supplied to the computer. Also, several hours may elapse between submission of the problem and the return of the computer answer, which may be unacceptable if the results must be available during the course of the experiment. A further disadvantage of such a technique results from the fact that the curve fitting is stritcly mathematical and therefore an experimenter cannot easily apply his judgement to the curve fitting in order to allow for non-ideal characteristics of the system under test.

Thus, a need exists for a relatively simple apparatus by means of which a complex curve can be simulated, and once simulated the various parameters of the curve's component parts can be conveniently and simply obtained or determined.

OBJECTS AND SUMMARY OF THE INVENTION

It is a primary object of the present invention to provide a relatively simple complex waveform simulator.

Another object of the present invention is to provide an apparatus for producing a composite curve which is a sum of two or more simpler functions whose parameters are easily adjustable so that the produced curve matches an experimentally produced complex curve.

A further object of the present invention is to provide a relatively simple apparatus for producing a displayable complex curve which is the sum of two or more exponentially damped sine waves, whose amplitude, frequency, damping factor and phase parameters are easily adjustable.

These and other objects of the present invention are achieved by providing a multi-channel apparatus, designed to produce or simulate a complex curve, which is displayed on an oscilloscope display surface, and which can be adjusted to match an original complex experimentally produced curve. In the example, used hereafter to describe the teachings of the present invention, the displayed or simulated curve or waveform is the algebraic sum of two or more independent damped sine waves whose frequency, amplitude, damping rate and phase parameters are independently varied by adjusting the operating parameters of each channel in which one of the damped sine waves is generated. The simulated curve on the oscilloscope is viewable through a transparent tracing of the original, experimentally produced complex curve which is taped directly to the oscilloscope viewing surface. The parameters of the various channels are then varied to produce a complex curve which is the best fit to the data curve.

The simulated and the original data curve may be utilized in a variety of ways other than the displayed on an oscilloscope. For example, the two or the difference therebetween may be recorded on an X–Y recorder with a waveform translator. Thus, the following description of the use of an oscilloscope should be regarded as an example, rather than as a limitations, on the teachings disclosed herein.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
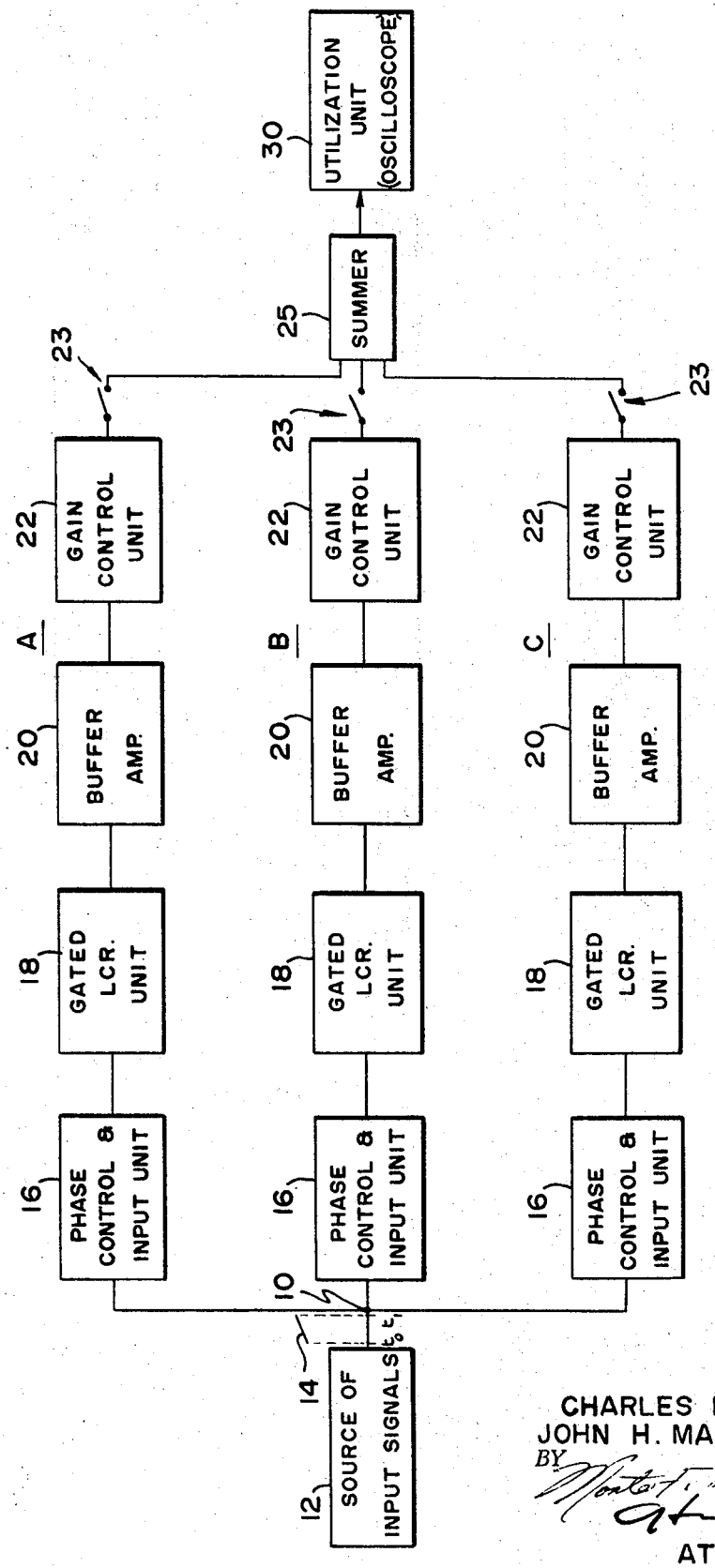
FIG. 1 is a block diagram of one embodiment of the present invention.
Figure 2:
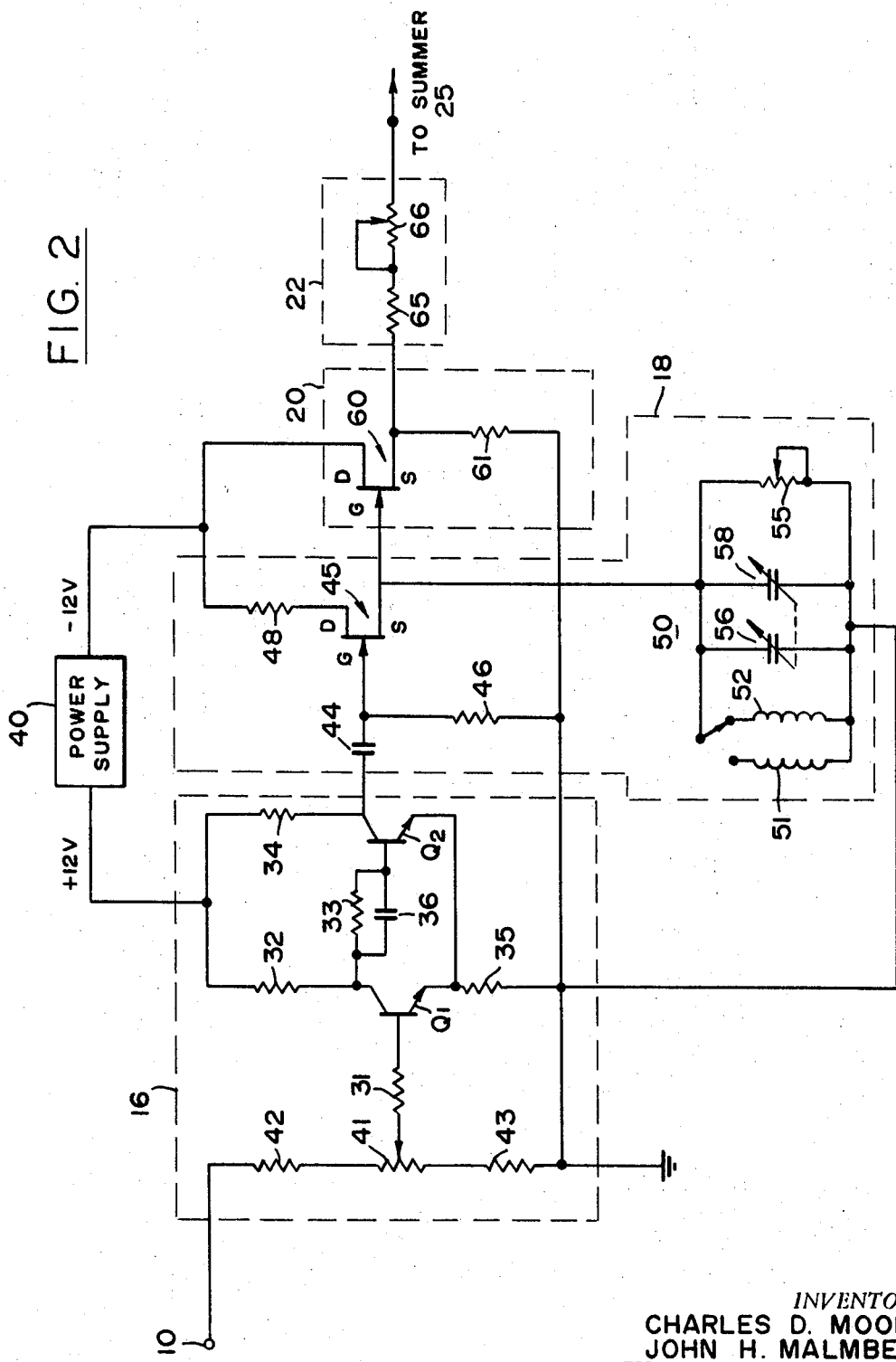
FIG. 2 is a schematic diagram of one of the three channels, shown in FIG. 1.

Reference is now made to FIGS. 1 and 2 in conjunction with which an embodiment of the invention, designed to provide a composite curve which consists of up to three exponentially damped sine waves, will be described.

FIG. 1 is a block diagram of the apparatus consisting of three identical channels, designated A, B and C, while FIG. 2 is a schematic diagram of one of the channels. Briefly, the three channels are connected to an input terminal 10, which is connected to a source of input signals 12. Source 12 provided a sawtooth voltage designated 14, which is assumed to vary from zero at time $t_0$ to a maximum at time $t_1$.

Each channel includes a phase control and input unit 16, connected between terminal 10 and a gated inductive-capacitance-resistance (LCR) unit 18. The latter is connected through a buffer amplifier 20 to a gain control unit 22. The outputs of units 22 of the three channels are connected through switches 23, to a summer 25, whose output is in turn supplied to a complex waveform utilization unit, such as an oscilloscope, designated by numeral 30. The function of switches 23 is to enable the supply of the output only of one or a selected combination of the channels to summer 25.

Briefly, the phase control and input unit 16 of each channel serves to control the instant with respect to time $t_0$, representing the start of the sawtooth voltage 14, at which LCR unit 18 supplies an exponentially damped sine wave through buffer amplifier 20, gain control unit 22 and switch 23 to summer 25. It should be stressed at this point that even though the term "phase control" is used herein, in practice, it is the start time of the wave with respect to the start times of the other waves that unit 16 controls. Consequently, unit 16 may also be thought of as a time delay control and input unit.

Unit 18 includes a tank circuit consisting of an inductor, a capacitor and a resistor which are connected in parallel. The tank inductance is adjustable to provide frequency range selectivity, while the capacitance is adjustable for fine frequency tuning. Also, the resistance is adjustable to control the damping factor or characteristic of the exponentially damped sine wave.

The gain or amplitude of the wave envelope produced by each channel is controlled by its corresponding gain control unit 22. Thus, each channel includes means by which the frequency, amplitude, damping factor and phase relationship of the exponentially damped sine wave generated therein, with respect to the waves generated in the other units, are controllable. In the particular example, the waves produced in the three channels are supplied to summer 25 whose output, representing a complex waveform consisting of three exponentially damped sine wave components, is displayed on oscilloscope 30.

By placing a transparency which represents an experimentally produced complex curve to be analyzed on the face of the oscilloscope, the adjustable means of the three channels may be adjusted until the displayed curve on oscilloscope 30 provides a best match to the transparency curve. Thereafter, the output of each of the channels may be separately displayed on oscilloscope 30, by opening switches 23 on the other channels, to determine the actual parameters of each component of the complex curve.

As seen from FIG. 2, in one embodiment of the invention, the phase control and input unit 16 of each channel comprises a pair of transistors Q1 and Q2, which together with resistors 31 through 35 and capacitor 36 are interconnected to form a Schmitt trigger, shown connected between a first reference voltage, such as +12 volts supplied from a power supply 40 and another reference potential such as ground.

Resistor 31, which serves as an input resistor, is connected between the base of transistor Q1 and the movable arm of an adjustable resistor or potentiometer 41, which together with resistors 42 and 43 are connected between the input terminal 10 and ground. In essence, resistors 41, 42 and 43 serve as a voltage divider, so that by adjusting the position of the movable arm of resistor 41, the instant at which the Schmitt trigger is fired with respect to the start of the sawtooth voltage 14 (see FIG. 1) is controlled. Thus, phase control is provided.

The gated LCR unit 18 to which the output of the Schmitt trigger is supplied through an input capacitor 44 includes a field effect transistor (FET) 45 with its gate electrode connected to the input capacitor 44 and through a resistor 46 to ground. The drain electrode of transistor 45 is connected through a resistor 48 to power supply 40 to receive a −12 volts potential therefrom.

Unit 18 also includes a parallel tank circuit 50 connected between the source electrode of transistor 45 and ground. In the particular example diagrammed in FIG. 2, the parallel tank circuit is shown consisting of two inductors 51 and 52 only one of which is connected in parallel with an adjustable resistor 55 and parallelly connected adjustable capacitors 56 and 58.

A large frequency range of the exponentially damped sine waves to be produced in the channel is provideable by selecting inductors 51 and 52 so that one of them has an inductance value of 5 to 10 times the inductance of the other. Thus, the two inductors may be thought of as providing frequency range control. Likewise frequency tuning is provided by the adjustment of capacitors 56 and 58 thereby controlling the total tank capacitance. Damping rate of the damping characteristics of the sine wave to be generated are controlled by the adjustment of adjustable resistor 55.

Briefly, when the Schmitt trigger in circuit 16 is fired, it applies a steep positive-going step signal to the gate electrode of transistor 45, abruptly cutting off the current flow to the inductor in the tank circuit, thereby initiating the characteristic damped sine wave of the simple parallel LCR tank circuit 50. The initial voltage value of the generated wave is essentially zero and the initial phase is at zero crossing. The output voltage signal across the tank circuit 50 is coupled to the summer 25 through the buffer amplifier 20, which in FIG. 2 is shown consisting of a FET transistor 60, whose gate electrode is connected to tank circuit 50, whose drain electrode is connected to the −12 volts, and whose source electrode is connected through a resistor 61 to ground. The output of buffer amplifier 20 at its source electrode is connected to the gain control unit 22 which is shown consisting of a fixed resistor 65 and an adjustable resistor 66. The gain or amplitude of the exponentially damped sine wave generated in the channel is controlled by the adjustment of resistor 66.

Summer 25, to which the outputs of all the channels, such as the three diagrammed in FIG. 1, are supplied, may be implemented with any known multi-input analog summer whose output is supplied to the oscilloscope 30 for display thereon. The summing of the outputs of the various channels may be performed within the oscilloscope in an appropriate circuit. For example, in one particular reduction to practice, summing of the channel outputs was performed by using an oscilloscope manufactured by the Tektronix Company of Seattle, Wash., in which a type "O" operational plug-in amplifier was connected as an AC coupled summing amplifier. Such an arrangement has been found to be advantageous, since it eliminated the DC pedestal component of the buffer amplifiers before summing.

It has been found that in order to generate lightly damped waveforms, it is necessary that the unloaded Q of the LCR tank circuit be as high as possible. Ferrite toroidal inductors were found to exhibit the best values of Q for an inductance range of 200 millihenries to 1 henry. Transistors 45 and 60 were chosen from the FET type because of the high impedance characteristics of such devices. Actually, FET's 45 and 60 are shunt loads on the tank circuit 50. Both transistors exhibit shunt resistances in excess of 5 megohms during the ringing time of the tank circuit. Measurement of the output of each individual channel has shown that the output is a very accurately exponentially damped sine wave.

Figure 3:
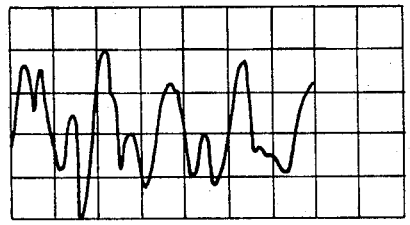
FIGS. 3 through 7 are waveform diagrams, useful in explaining the novel invention.
Figure 4:
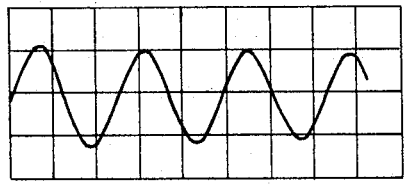
Figure 5:
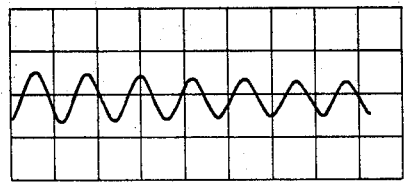
Figure 6:
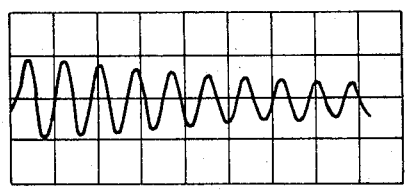
Figure 7:
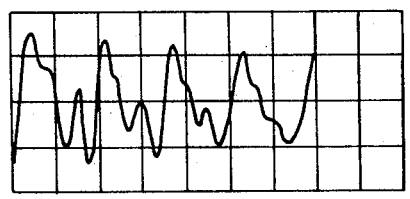

Reference is now made to FIG. 3 which is an interferrogram of a multi-mode plasma wave, and which is typical of a type of a complex wave or curve which can be easily analyzed with the complex waveform simulator of the present invention. Indeed, in one experiment, a very good fit or approximation of the interferrogram of FIG. 3 was produced with the three channel simulator, such as the one diagrammed in FIGS. 1 and 2. FIGS. 4, 5 and 6 are waveforms actually produced by the three channels of the simulator. The combined waveforms produced a composite waveform, shown in FIG. 7, and which is seen to be very similar to the actual multi-mode plasma wave interferrogram, shown in FIG. 3.

After producing the complex waveform (FIG. 7) which was found to be a very good fit of the interferrogram to be analyzed (FIG. 3), each individual component was analyzed by turning off the other channels with switches 23. Thus, the actual parameters of each of the complex curve components are easily and conveniently obtainable.

Although the teachings of the present invention have hereinbefore been described in conjunction with a complex waveform simulator designed to produce a complex waveform consisting of a plurality of (three) exponentially damped sine waves with adjustable amplitude, frequency, damping factor and phase parameters, it should be appreciated by those familiar with the art that the teachings of the invention are equally applicable to generate a complex curve, whose component parts are other than exponentially damped sine waves. Thus, in the broad sense, the simulator of the present invention may be thought of as an apparatus designed to produce a complex waveform to match a complex waveform generated in experiment or a scientific application, where the simulated waveform consists of a plurality of components. The parameters of each of the components is adjustable until the complex waveform matches the experimentally produced curve. Thereafter, each complex waveform component may be separately analyzed, i.e., its parameters determined by turning off the other components and by separately measuring the parameters of each component.

Although the teachings of the present invention have been described in conjunction with an example, in which a complex curve is simulated and changed to correspond to an original data produced curve, it should be appreciated that the teachings are not limited to such an application only. The waveform simulator may be used in other applications. For example, it can serve as a teaching aid to an experimentalist to enable him to rapidly generate the sort of waveforms which appear in an experiment conducted by him. The novel simulator of the invention would enable the experimentalist to vary the parameters in an exceedingly simple way and to study the changes that occur in the complex curve as a result of the changes of parameters of one or more of the waveforms.

In many cases, after a period of education of this kind, the experimentalist would be in the position to better understand an experimentally-produced curve without having to resort to direct comparison of the experimentally-produced curve and the complex curve which can be generated with the simulator. It should be noted, that in the teaching aid application, the curve which is generated is used directly for educational purposes rather than for comparison with a data-produced curve.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A complex waveform simulator comprising:
   a plurality of waveform generating channels, each channel including means for generating an exponentially damped sinusoidal waveform of adjustably selected frequency, amplitude and damping characteristics, each channel further including a tank circuit comprising a variable resistor, at least one variable capacitor, connected in parallel across said resistor, at least first and second inductors, and means for selectively connecting at least one of said inductors in parallel across said resistor and capacitor;
   summing means responsive to the waveform generated by said plurality of channels for providing a composite waveform as a function thereof;
   means coupled to said summing means for utilizing said composite waveform; and
   phase control means for controlling the relative start times of the waveforms generated in said channels, said phase control means comprising a source of an input signal with an amplitude having a saw-tooth waveshape, and a separate phase control circuit in each channel which is responsive to said input signal to trigger the start time of the waveform generated in the channel when the amplitude of said input signal reaches a preselected level.

2. The arrangement as recited in claim 1 wherein the inductance of one of said inductors is on the order of at least five times the inductance of the other inductor.

3. The arrangement as recited in claim 1 wherein each channel includes a field-effect transistor connected to the channel's phase control circuit and to the channel's tank circuit for terminating the supply of current to the tank circuit when the amplitude of the input signal applied to the channel's phase control circuit reaches said preselected level.

References Cited
UNITED STATES PATENTS
3,124,884    3/1964    Capecelatro et al. _____ 35—19
3,488,862    1/1970    Eckhart, Jr. _____ 35—19

HARLAND S. SKOGQUIST, Primary Examiner